United States Patent [19]

Morimoto et al.

[11] 4,397,667

[45] Aug. 9, 1983

[54] METHOD OF COLORING GLASS SHEET BY DIFFUSION AND REDUCTION OF SILVER IONS

[75] Inventors: Hiroshi Morimoto, Kyoto; Hajime Inoue; Kazuo Ueda, both of Matsusaka, all of Japan

[73] Assignee: Central Glass Company, Limited, Ube, Japan

[21] Appl. No.: 328,630

[22] Filed: Dec. 8, 1981

[30] Foreign Application Priority Data

Dec. 9, 1980 [JP] Japan ............................ 55-172636

[51] Int. Cl.$^3$ ..................... C03C 17/10; C03C 21/00
[52] U.S. Cl. .................................. 65/30.13; 65/60.51; 65/99.2; 427/383.5
[58] Field of Search ................. 65/30.13, 32, 60.4, 65/60.51, 99.2; 427/165, 383.5

[56] References Cited

U.S. PATENT DOCUMENTS

3,420,698 1/1969 Smith ............................ 65/30.13
4,155,735 3/1979 Ernsberger ................ 65/60.4 X

FOREIGN PATENT DOCUMENTS

1006699 3/1977 Canada .
1006700 3/1977 Canada .
49-14510 2/1974 Japan .

*Primary Examiner*—Richard V. Fisher
*Attorney, Agent, or Firm*—Fleit, Jacobson & Cohn

[57] ABSTRACT

A method of coloring a glass sheet which must contain reducing ions such as tin ions diffused into a surface layer thereof. The reducing ions may originate in a molten metal bath used in producing the glass sheet by the float process. A coloring agent comprising a powder mixture of 1 part by weight of a substance expressed by $Ag_xW_yO_z$, wherein $x:y:z$ is 1–2:1:2–4, and 5 to 20 parts by weight of a transition metal oxide, e.g. $Cr_2O_3$, is applied to the glass sheet surface, and the glass sheet is heated so as to cause silver ions to diffuse into the surface layer of the glass sheet and undergo reduction by the action of the precedingly diffused ions to produce color. Conveniently, use is made of a paste prepared by dispersing the powder mixture in an organic liquid vehicle. Owing to the stability of the silver-containing oxide $Ag_xW_yO_z$, uniform coloring is achieved without encountering difficulty and without degrading the quality of the glass sheet.

12 Claims, No Drawings

METHOD OF COLORING GLASS SHEET BY DIFFUSION AND REDUCTION OF SILVER IONS

BACKGROUND OF THE INVENTION

This invention relates to a method of coloring a glass sheet, the method being of the type commonly called a staining method in which silver ions are diffused into a surface layer of the glass sheet and caused to undergo reduction in that surface layer.

A broad concept of coloring a glass sheet by diffusing silver ions into a surface layer of the glass sheet and causing the diffused silver ions to undergo reduction has already been embodied in some methods. According to Japanese Patent Applications Primary Publication Nos. 48(1973)-43714 and 48(1973)-43715, equivalent to Canadian Pat. Nos. 1,006,700 and 1,006,699 both issued Mar. 15, 1977, for example, a silver salt such as silver sulfate, silver nitrate or silver chloride, in the form of paste, is applied to a surface of a glass sheet, the glass sheet containing ions, reducing such as tin ions, which have been diffused to a small depth in the glass surface. The paste is heated on the glass surface to cause diffusion of silver ions into the surface layer of the glass sheet. The diffused silver ions are reduced by the reducing ions in the glass thereby producing color. As a modification, Japanese Patent Application Primary Publication No. 49(1974)-14510, published Feb. 8, 1974, shows a coloring method having the steps of applying a mixture of a silver compound, such as silver sulfide or silver chloride, and a glass frit to a surface of a glass sheet, heating the glass sheet and the applied mixture to cause diffusion of silver ions into a surface layer of the glass sheet, removing the residue of the mixture from the glass surface, and then heating the glass sheet in a reducing gas atmosphere to cause the diffused silver ions to undergo reduction and produce color.

In practice, however, these known staining methods encounter various problems and inconveniences that are mostly attributed to the chemical and physical properties of the silver compound. Firstly, silver compounds used in these methods are generally sensitive to light and liable to decompose to grayish or blackish substances. Secondly, these silver compounds tend to deliquesce by the effect of moisture or react with other ingredients of the silver compound paste and, hence, it is difficult to prepare the paste. Thirdly, these silver compounds are rather low in chemical stability, so that sometimes a glass sheet is colored nonuniformly because of thermal decomposition of the silver compound heated on the glass surface. Furthermore, when heated, these silver compounds emit corrosive decomposition gases which corrode the colored surface of the glass sheet and deteriorate the transparency of the colored glass sheet and exert a significantly detrimental effect upon the furnace used in the heating process.

SUMMARY OF THE INVENTION

It is an object of the present invention to solve the above described problems in the hitherto proposed staining methods and provide an improved method of coloring a glass sheet, which method gives a uniformly colored glass sheet without damaging the glass surface and without encountering difficulty in practical operations.

The present invention provides a method of coloring a glass sheet, which contains reducing ions diffused into a major surface layer thereof, fundamentally by the diffusion of silver ions from a solid silver compound which is applied to the major surface of the glass sheet, and resultant reduction of the diffused silver ions. This method comprises the steps of applying a coloring agent, which comprises a mixture of a finely powdered silver-containing oxide of the general formula $Ag_x W_y O_z$ and a finely powdered transition metal oxide, onto the major surface of the glass sheet, and subsequently heating the glass sheet and the applied coloring agent so as to accelerate the ionization and diffusion of the silver contained in the silver-containing oxide into the surface layer of the glass sheet. In the general formula, the ratio $x:y$ is in the range from 1:1 to 2:1 and the ratio $y:z$ is in the range from 1:2 to 1:4. The weight ratio of the silver-containing oxide to the transition metal oxide is required to be in the range from 1:5 to 1:20.

The presence of reducing ions in the surface layer of the glass sheet is necessary for reducing the subsequently diffused silver ions to produce color. In the practice of the method according to the invention, it is convenient to use a glass sheet produced by the float process. Because of intimate contact of a major surface of the glass sheet with the surface of molten tin used in the float process, the glass sheet produced by this process always contains tin ions diffused from that major surface to a depth of about 10–30 microns. The diffused tin ions are mostly in the state of $Sn^{2+}$ although in the very shallow outermost surface layer they are in the state of $Sn^{4+}$.

If it is intended to use a glass sheet produced by a different process, suitable metal ions such as the ions of tin, iron, antimony or arsenic can be diffused into a surface layer of the glass sheet by melting the selected metal or its alloy and contacting a major surface of the glass sheet with the molten metal.

The essential feature of the invention is to use a mixture of the above defined silver-tungsten oxide and a transition metal oxide as a coloring agent. This silver-tungsten oxide is both chemically and physically stable and accordingly has advantages over the silver compounds used in hitherto proposed staining methods. The transition metal oxide serves the function of promoting thermal ionization of silver contained in this coloring agent and also is effective for prevention of strong adhesion of the residue of the heated coloring agent to the glass surface. As the transition element, selection can be made among V, Cr, Mo, Mn, Fe, Cu, W, Rh, Pd and Cd. In practice, it is convenient to use this coloring agent in the form of a paste prepared by uniformly dispersing a powder mixture of the silver-containing oxide and the transition metal oxide in a liquid vehicle.

By a method according to the invention, a surface layer of a glass sheet can be colored uniformly and lustrously. Because of the use of a stable coloring agent there is no possibility of nonuniform coloring attributed to unwanted decomposition of the coloring agent. Besides, this coloring agent does not emit corrosive decomposition gases when heated on the glass surface, so that the coloring treatment according to the invention does not result in corrosion of the colored glass surface. This method can readily be put into industrial practice and is applicable, for example, to shading of the windshields of automobiles.

DESCRIPTION OF THE PREFERRED EMBODIMENTS

In the present invention, any one of a group of oxides expressed by general formula $Ag_xW_yO_z$ (x:y:z=1-2:1-:1-4) can be used. A typical and particularly preferred example of these oxides is the compound $Ag_2WO_4$.

The mole ratio x:y is limited within the range from 1:1 to 2:1 because the coloring effect becomes insufficient when the proportion of x (Ag) is smaller than 1:1, but this material becomes costly when the proportion of x is made greater than 2:1. The mole ratio y:z is limited within the range from 1:2 to 1:4 because removal of the residue of the heated coloring agent from the glass surface becomes difficult when the proportion of z (O) is either smaller than 1:2 or greater than 1:4 and also because the coloring effect is lowered when the proportion of z is greater than 1:4.

In preparing a coloring agent according to the invention, the silver-containing material expressed by $Ag_xW_yO_z$ is used in finely powdered form firstly because it becomes easy to uniformly disperse this material in the coloring agent and secondly because ionization of silver contained in this material by heating in the presence of a transition metal oxide becomes easier as the specific surface area of this material becomes larger. Preferably this material is powdered so as to have a specific surface area not larger than 10 $\mu$m, and most preferably not larger than 0.5 $\mu$m, in its particle size.

A transition metal oxide is contained in the coloring agent in order to serve the function of promoting partial ionization of silver contained in the above described silver-containing oxide by donation and acceptance of electric charges as it undergoes changes in its atomic valence when heated to temperatures suited to the coloring process, e.g. temperatures in the range from about 450° C. to about 800° C. Examples of useful transition metal oxides are $V_2O_5$, $Cr_2O_3$, $MoO_3$, $MnO_2$, $Fe_2O_3$, CuO, $WO_3$, $Rh_2O_3$, PdO and CdO. Usually one of these oxides is selected, but if desired it is permissible to jointly use two or more kinds of these oxides. The transition metal oxide, too, is used in finely powdered form, and it is preferred that the particle size of the powder be not larger than 10 $\mu$m.

In a coloring agent according to the invention, the mixing ratio of the silver-containing oxide to the transition metal oxide can be varied according to a desired density of the color afforded to the glass sheet or transmittance of the colored glass sheet to visible light. However, the mixing ratio is limited within the range from 1:5 to 1:20 by weight because when the proportion of the silver-containing oxide to the transition metal oxide is smaller than 1/20 the coloring treatment tends to result in insufficient color density and nonuniformity of coloring, and when the proportion of the silver-containing oxide is greater than 1/5 removal of the residue of the heated coloring agent from the glass surface becomes difficult as the result of reaction between the silver-containing oxide and the glass.

As mentioned hereinbefore, it is preferred to use the coloring agent in the form of a paste. As a liquid vehicle for preparation of a paste suited for practical operation, it is preferred to use a solution of an organic polymeric substance such as a cellulose derivative in an organic solvent such as terpineol, cellosolve or carbitol. A powder mixture of the silver-containing oxide and the transition metal oxide is well mixed with such a liquid vehicle to achieve uniform dispersion. The proportion of the powder mixture to the liquid vehicle would be adjusted so as to realize a viscosity suited to a selected method of applying the paste to the glass sheet surface.

The coloring agent paste is applied onto the surface of the glass sheet from which the reducing ions were diffused so as to form a thin layer of the paste either over the entire area of the glass surface or over only a selected area of the glass surface. In most cases it is suitable and convenient to employ a screen-printing method for application of the paste to the glass surface.

After drying of the printed paste layer to evaporate the solvent, the glass sheet is heated to a suitable temperature, usually in the range from about 450° C. to about 800° C. This heating treatment results in that silver contained in the coloring agent ionizes and diffuses into the surface layer of the glass sheet and that color is produced in the surface layer of the glass sheet as the diffused silver ions undergo reduction by making contact with the priorly diffused reducing ions.

Thereafter the glass sheet is left to cool to room temperature, and the residue of the coloring agent is removed from the colored glass surface by washing with water or any other suitable liquid.

The following nonlimitative examples are presented to illustrate the method according to the invention.

EXAMPLE 1

A paste was prepared by uniformly dispersing a mixture of 1 part by weight of a finely powdered oxide, $Ag_2WO_4$ and 5 parts by weight of finely powdered $Cr_2O_3$ in a liquid vehicle, the liquid vehicle being a solution of ethyl cellulose in terpineol, amounting to 40% by weight of the powder mixture.

A glass sheet having a thickness of 5 mm produced by the float process was cut into a test piece 300 mm×300 mm. By using a screen-printing method, the aforementioned paste was applied onto the major surface of the glass sheet which had been in contact with the molten metal (tin) used in the float process so as to form a thin layer of the paste on the glass surface. The printed paste layer was dried at 60° C. for 20 minutes, and then the paste-applied test piece was heated for 3 minutes in an electric oven maintained at 700° C. The thus treated test piece was let cool to room temperature and then washed with water to completely remove the residue of the paste from the glass surface.

As a result, the test piece of glass sheet was uniformly colored yellowish in a shallow layer contiguous to the treated surface. The transmittance to the visible region of the spectrum measured by a cloudiness meter was 20.7% for the colored test piece, whereas the transmittance of the original glass sheet used in this example was 91%.

EXAMPLES 2 AND 3

In these examples, the process of Example 1 was generally similarly performed except that the weight ratio of the silver-containing oxide ($Ag_2WO_4$) to $Cr_2O_3$ was varied to 1:9 in Example 2 and to 1:20 in Example 3.

In both Examples 2 and 3 the coloring of the glass sheet was achieved well, but the density of the color was lowered, and accordingly the transmittance of the colored glass sheet increased as the amount of $Cr_2O_3$ was increased. The data are presented in Table I.

REFERENCES 1 AND 2

The process of Example 1 was generally similarly performed except that the weight ratio of $Cr_2O_3$ to the silver-containing oxide was decreased to 3:1 in Reference 1 and increased to 25:1 in Reference 2.

In the case of Reference 1, heating of the paste-applied test piece caused the residue of the paste to adhere intensely to the glass surface, and the paste could hardly be removed. In the case of Reference 2 the glass sheet was colored nonuniformly.

EXAMPLE 4

As a sole modification of the process of Example 2, an oxide expressed by $AgWO_4$ was used in place of the silver-containing oxide ($Ag_2WO_4$) in Example 2. The result was satisfactory, and the transmittance of the colored glass sheet was as shown in Table I.

EXAMPLE 5

As a sole modification of the process of Example 2, $MnO_2$ was used in place of $Cr_2O_3$ in Example 2. The result in this case also was satisfactory. The transmittance value is shown in the same Table I.

TABLE I

|  | Composition of Coloring Agent (by weight) |  | x:y:z | Transmittance (%) | Uniformity of Coloring |
|---|---|---|---|---|---|
| Ref. 1 | $Ag_xW_yO_z$:$Cr_2O_3$ | 1:3 | 2:1:4 | — | — |
| Ex. 1 | $Ag_xW_yO_z$:$Cr_2O_3$ | 1:5 | 2:1:4 | 20.7 | uniform |
| Ex. 2 | $Ag_xW_yO_z$:$Cr_2O_3$ | 1:9 | 2:1:4 | 24.4 | uniform |
| Ex. 3 | $Ag_xW_yO_z$:$Cr_2O_3$ | 1:20 | 2:1:4 | 28.6 | uniform |
| Ref. 2 | $Ag_xW_yO_z$:$Cr_2O_3$ | 1:25 | 2:1:4 | 51.7 | nonuniform |
| Ex. 4 | $Ag_xW_yO_z$:$Cr_2O_3$ | 1:9 | 1:1:4 | 36.2 | uniform |
| Ex. 5 | $Ag_xW_yO_z$:$MnO_2$ | 1:9 | 2:1:4 | 26.0 | uniform |

Note:
In Examples 1-5 and Reference 2, the coloring treatment did not damage the smoothness of the glass surface.

What is claimed is:

1. A method of coloring a glass sheet which contains reducing ions, the method comprising the steps of:
   applying a coloring agent which comprises a mixture of a finely powdered silver-containing oxide expressed by general formula $Ag_xW_yO_z$, wherein the ratio x:y is in the range from 1:1 to 2:1 and the ratio y:z is in the range from 1:2 to 1:4, and a transition metal oxide onto a major surface of the glass sheet, the weight ratio of said silver-containing oxide to said transition metal oxide being in the range from 1:5 to 1:20; and
   heating the glass sheet applied with said coloring agent so as to cause silver contained in said coloring agent to ionize and diffuse into a surface layer of the glass sheet.

2. A method according to claim 1, wherein said transition metal oxide is at least one oxide of a metal selected from the group consisting of V, Cr, Mo, Mn, Fe, Cu, W, Rh, Pd and Cd.

3. A method according to claim 1, wherein said transition metal oxide is at least one oxide selected from the group consisting of $V_2O_5$, $Cr_2O_3$, $MoO_3$, $MnO_2$, $Fe_2O_3$, CuO, $WO_3$, $Rh_2O_3$, PdO and CdO.

4. A method according to claim 3, wherein said coloring agent is in the form of a paste containing said mixture dispersed in a liquid vehicle.

5. A method according to claim 4, wherein said liquid vehicle is a solution of an organic polymeric substance in an organic solvent.

6. A method according to claim 1 or 4, wherein the particle size of said powdered silver-containing oxide is not larger than 10 μm.

7. A method according to claim 6, wherein the particle size of said powdered transition metal oxide is not larger than 10 μm.

8. A method according to claim 4, wherein said paste is applied to said major surface of the glass sheet by a screen-printing method.

9. A method according to claim 1, wherein the glass sheet applied with said coloring agent is heated to a temperature in the range from about 450° C. to about 800° C.

10. A method according to claim 1, wherein said silver-containing oxide is expressed by $Ag_2WO_4$.

11. A method according to claim 1, wherein said reducing ions are ions of a metal selected from the group consisting of Sn, Fe, Sb and As.

12. A method according to claim 1, wherein said reducing ions are tin ions which originate in a molten metal bath used in producing the glass sheet by the float process.

* * * * *